US012613087B2

(12) United States Patent
Brühlmann et al.

(10) Patent No.: US 12,613,087 B2
(45) Date of Patent: Apr. 28, 2026

(54) COORDINATE MEASURING MACHINE

(71) Applicant: HEXAGON TECHNOLOGY CENTER GMBH, Heerbrugg (CH)

(72) Inventors: Danick Brühlmann, Staad (CH); Nikolay Khanenya, St. Gallen (CH); Pascal Jordil, Ecoteaux (CH); Gabriel Koller, Güttingen (CH); Jan Züllig, Neukirch (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 344 days.

(21) Appl. No.: 18/421,806

(22) Filed: Jan. 24, 2024

(65) Prior Publication Data

US 2024/0401925 A1     Dec. 5, 2024

(30) Foreign Application Priority Data

Jan. 25, 2023     (EP) ..................................... 23153234

(51) Int. Cl.
G01B 5/008     (2006.01)
G01B 5/012     (2006.01)
G01B 21/04     (2006.01)
G01D 5/347     (2006.01)

(52) U.S. Cl.
CPC ........... G01B 5/012 (2013.01); G01B 21/047 (2013.01); G01D 5/3473 (2013.01)

(58) Field of Classification Search
CPC ..................................................... G01B 5/008
USPC ........................................................... 33/503
See application file for complete search history.

(56) References Cited

U.S. PATENT DOCUMENTS

| | | | | | |
|---|---|---|---|---|---|
| 5,890,300 | A | * | 4/1999 | Brenner | ................ G01B 5/012 |
| | | | | | 33/704 |
| 7,296,363 | B2 | * | 11/2007 | Danisch | ................ G01P 15/18 |
| | | | | | 33/503 |
| 7,568,293 | B2 | * | 8/2009 | Ferrari | ................ G01B 5/008 |
| | | | | | 33/503 |
| 7,693,325 | B2 | * | 4/2010 | Pulla | ................ G01B 9/0205 |
| | | | | | 356/138 |

(Continued)

FOREIGN PATENT DOCUMENTS

| | | |
|---|---|---|
| CN | 111844075 A | 10/2020 |
| DE | 10 2007 051 984 A1 | 5/2009 |

(Continued)

OTHER PUBLICATIONS

Extended European Search Report dated Jun. 23, 2023 as received in Application No. 23153234.2.

*Primary Examiner* — George B Bennett
(74) *Attorney, Agent, or Firm* — Maschoff Brennan

(57)     ABSTRACT

A coordinate measuring machine for determining at least one spatial coordinate of a measurement point on an object, comprising a structure movably connecting a probe head to a base, the structure comprising a plurality of rotary joints and a plurality links, wherein each rotary joint comprises at least one driving unit, wherein the coordinate measuring machine comprises a control unit configured to control the driving units for driving the probe head relative to the base for approaching the measurement point, to receive angular data, and to determine the at least one spatial coordinate of the measurement point based on the angular data.

17 Claims, 14 Drawing Sheets

(56)　　　　　　References Cited

U.S. PATENT DOCUMENTS

| | | | | |
|---|---|---|---|---|
| 7,804,602 | B2 * | 9/2010 | Raab ..................... | G01B 21/04 |
| | | | | 356/614 |
| 8,122,610 | B2 * | 2/2012 | Tait ..................... | G01B 21/042 |
| | | | | 33/502 |
| 9,541,371 | B2 * | 1/2017 | Pettersson .............. | G01D 5/241 |
| 10,495,455 | B2 * | 12/2019 | Pettersson .............. | F21V 21/26 |
| 11,454,499 | B2 | 9/2022 | Lippuner et al. | |
| 11,768,067 | B2 * | 9/2023 | Angood ................ | B25J 18/002 |
| | | | | 33/503 |
| 2005/0166413 | A1 | 8/2005 | Crampton | |
| 2014/0101953 | A1 * | 4/2014 | Briggs .................. | G01B 5/008 |
| | | | | 33/503 |
| 2016/0327383 | A1 | 11/2016 | Becker et al. | |
| 2024/0019237 | A1 * | 1/2024 | Khanenya ............. | G01B 5/008 |

FOREIGN PATENT DOCUMENTS

| | | | | | |
|---|---|---|---|---|---|
| EP | 3128291 | A1 * | 2/2017 | ............ | G01B 21/04 |
| EP | 2 553 386 | B1 | 10/2017 | | |
| EP | 22185501.8 | A | 1/2024 | | |
| EP | 4390305 | A1 | 6/2024 | | |
| JP | 2023002741 | A * | 1/2023 | .......... | G01B 5/0016 |

* cited by examiner

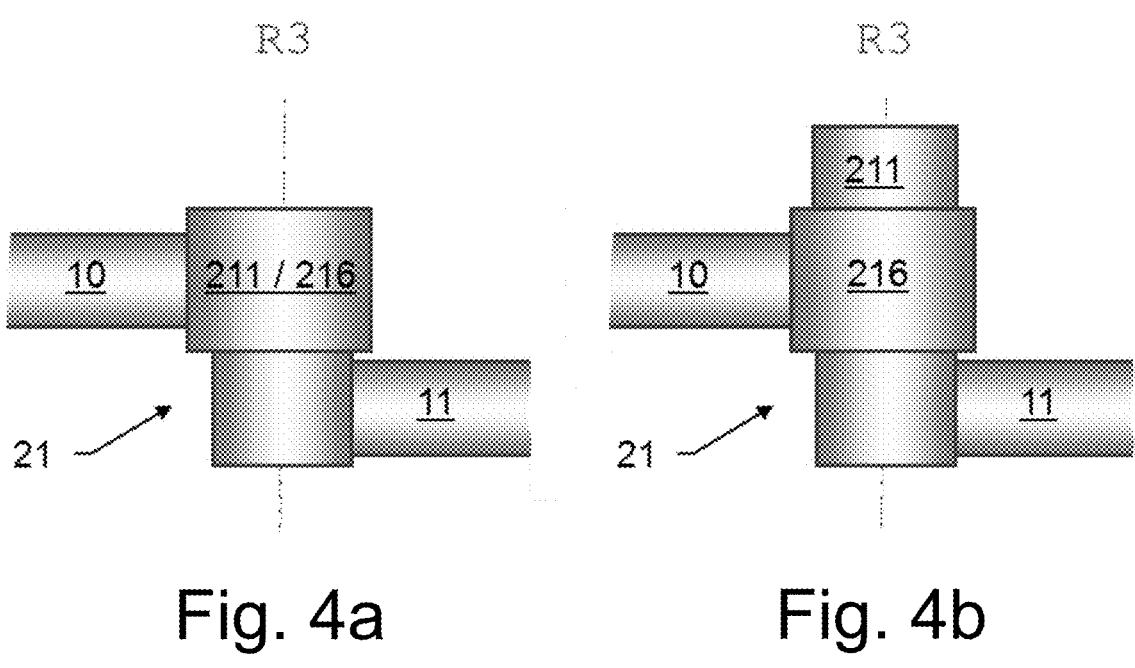
Fig. 4a                    Fig. 4b
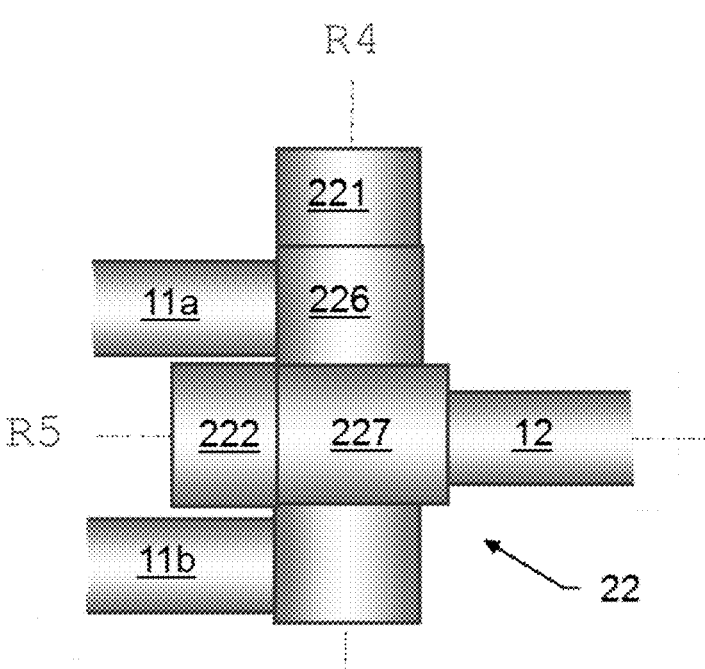
Fig. 5

5 DoF : $D_x$ $D_y$ $R_x$ $R_y$ $R_z$

3 DoF : $D_x$ $D_y$ $R_z$

COORDINATE MEASURING MACHINE

BACKGROUND

The present disclosure pertains to a coordinate measuring machine (CMM) comprising a plurality of rotary joints.

Coordinate measuring devices, such as stationary coordinate measuring machines or portable articulated arm coordinate measuring machines or laser-based coordinate measuring devices including laser trackers, laser scanners and total stations are used in a wide variety of applications in quality management and quality assurance. Conventionally, highly precise CMM need to be very stable in order to withstand inertial distortions that may arise due to its own operating weight and—especially since fast measurements are also desirable—its movements. Conventional CMM are thus very heavy devices that are complicated to move and cannot be installed everywhere, e.g. due to weight-loading restrictions. It would thus be desirable to provide a light-weight CMM that still allows highly-precise measurements.

SUMMARY

It is therefore an object of the present disclosure to provide an improved CMM which is less heavy than conventional CMM. It is a further object of the present disclosure to provide such a CMM that allows determining spatial coordinates with high precision. It is a further object of the present disclosure to provide such a CMM that may have light-weight and flexible structural components.

The disclosure pertains to a CMM for determining at least one spatial coordinate of a measurement point on an object, the CMM comprising a structure movably connecting a probe head to a base. The structure comprises a plurality of rotary joints and a plurality of elongate components, the components comprising a plurality of links, wherein each rotary joint comprises at least one driving unit comprising a motor, and at least one measuring unit comprising one or more sensors to determine at least one angle and to generate angular data. The CMM comprises a control unit configured

- to control the motor of each driving unit for driving the probe head relative to the base for approaching the measurement point,
- to receive the angular data, and
- to determine the at least one spatial coordinate of the measurement point based on the angular data.
- a first rotary joint provides movability of a first link relative to the base about a first axis of rotation and about a second axis of rotation;
- a second rotary joint provides movability of a second link relative to the first link about a third axis of rotation; and
- a third rotary joint provides movability of a third link and/or the probe head relative to the second link about a fourth axis of rotation and about a fifth axis of rotation.

According to some embodiments of the CMM, the first rotary joint comprises two separate driving units and two separate measuring units, wherein

- a first driving unit provides motorized movability of the first link relative to the base about the first axis of rotation,
- a second driving unit provides motorized movability of the first link relative to the base about the second axis of rotation,
- a first measuring unit measures at least an angle of rotation about the first axis of rotation, and a second measuring unit measures at least an angle of rotation about the second axis of rotation.

In some embodiments, the first and second axes of rotation are orthogonally aligned or basically orthogonally aligned, e.g. in an angle of between 85° and 95°.

In some embodiments, the first rotary joint comprises a cross-shaped mounting device that is configured to accept two orthogonal spindles of the first rotary joint, each spindle being aligned with one of the first and second axes of rotation. In some embodiments, this mounting device is made from a single piece of metal, particularly stainless steel.

According to some embodiments of the CMM, the third rotary joint comprises

- two separate driving units for providing motorized movability of the third link and/or the probe head relative to the second link about the fourth axis of rotation and about the fifth axis of rotation, and
- two separate measuring units for determining at least angles of rotation about the fourth axis of rotation and about the fifth axis of rotation.

In some embodiments, the fourth and fifth axes of rotation are orthogonally aligned or basically orthogonally aligned (e.g. with an angle of between 85° and 95°). In some embodiments, the third rotary joint comprises a cross-shaped mounting device that is configured to accept two orthogonal spindles of the third rotary joint, each spindle being collinear with one of the fourth and fifth axes of rotation. Collinear particularly means deviating less than ±2°.

According to some embodiments of the CMM, the second link is embodied as two parallel links ("fork"), wherein

- the second rotary joint provides movability of the two parallel links relative to the first link about the third axis of rotation; and
- the third rotary joint provides movability of the third link and/or the probe head relative to the second link about the fourth axis of rotation and about the fifth axis of rotation.

In some embodiments, the first link is embodied as a single link, i.e. not as a fork.

In some embodiments, the two parallel links connect with the third rotary joint at a first position and at a second position, wherein the first position and the second position are on opposite sides of the fifth axis of rotation.

In some embodiments, the third joint comprises a cut-out at the first position and/or second position to enhance movability of the third link and/or the probe head relative to the two parallel links about the fourth axis of rotation.

In some embodiments, the probe head can approach a measurement point next to the base while the first and fifth axes of rotation are parallel. To achieve this, the first link and the two parallel links are configured—particularly with respect to their relative lengths—to allow the probe head to move next to the base while the first and fifth axes of rotation are parallel (e.g. vertical).

According to some embodiments of the CMM, a measuring unit is assigned to each of the axes of rotation, wherein at least one of the sensors of at least one measuring unit is a rotary encoder determining at least one angle about the axis of rotation to which the respective measuring unit is assigned.

In some embodiments, at least one measuring unit comprises at least two rotary encoders and is configured to measure angles in at least five degrees of freedom, particularly wherein one measuring unit and one driving unit are provided for each axis of rotation. Alternatively, only one rotary encoder may be assigned to the measurement unit.

According to some embodiments, the CMM comprises two cable bundles inside a common housing, wherein a first cable bundle provides electric energy to the structure for powering the driving units and the measuring units, and a second cable bundle provides data communication between the control unit and at least a subset of driving units and measuring units, the data communication comprising at least one of the angular data and control data for controlling the motors, and optionally further data, such as measurement signals and control signals, e.g. temperature data from thermal sensors and control signals to heaters and coolers. A first end of each cable bundle is fixedly connected to the base and a second end of each cable bundle is fixedly connected to a part of the first rotary joint that is rotatable about the first axis of rotation relative to the base. The cable bundles are arranged inside the housing to allow a rotation of the first link about the first axis of rotation of at least 180° in each direction, preferably at least 360° in each direction.

In some embodiments—to allow the rotation of the first link about the first axis of rotation—in a first position of the CMM each of the two cable bundles is folded in such a way that each cable bundle winds itself around a cylindrical body—that is aligned with the first axis of rotation—if the first link is rotated clockwise or counter-clockwise about the first axis of rotation, and a length of the cable bundles is configured to allow both cables to be wound around the cylindrical body at least once, preferably at least twice, in each direction.

In some embodiments, in the first position each of the two cable bundles forms a closed loop, in particular being shaped like the Greek letter omega (Ω)—tilted by about 90°. In some embodiments, the first position is a zero position with respect to the first axis of rotation.

In some embodiments, the cylindrical body is a spindle of the first rotary joint or an extension to a spindle of the first rotary joint. Alternatively, a spindle of the first rotary joint is attached to the cylindrical body.

In some embodiments, each cable bundle is surrounded by a hose. This allows achieving higher stiffness to avoid kinking of the cables.

In some embodiments, the inside of the housing and/or the cylindrical body have a PTFE coating.

According to some embodiments of the CMM,
a first actuator provides movability of the probe head about a probe head's axis of rotation, particularly the fifth axis of rotation,
the probe head is connected to at least one cable, a length of the cable allowing a movability of the probe head about its axis of rotation by more than 360°, e.g. by at least ±210° or ±225° from a first position,
the cable is arranged as a spring, wherein a relative movement of the probe head, e.g. about its axis of rotation, enhances or reduces a tension within the spring, and
the spring is arranged in such a way that if the first actuator is turned off, a tension in the spring is automatically released, providing a force which moves the probe head about its axis of rotation, for instance towards the first position.

In some embodiments, the probe head is tiltable for approaching the measurement point.

In some embodiments, the third link comprises a spiral guidance for guiding the cable and maintaining the cable's shape as a spring, the spiral guidance having a spiralled shape, e.g. with the fifth axis of rotation as a centre, for instance having a PTFE coating.

In some embodiments, the third link comprises a mechanical end stop providing a movability of the probe head about its axis of rotation that equals or is smaller than the movability allowed by the length of the cable. For instance, the mechanical end stop allows a movement of at least ±210° or ±225° from the first position.

In some embodiments, an absolute angular sensor is provided for determining an angle of the probe head relative to its axis of rotation, e.g. angles between 0° and 360°. The probe head's movability about its axis of rotation by more than 360° then results in an ambiguous angular range, in which the absolute angular sensor cannot determine the angle of the probe head unambiguously. Therefore, the spring is arranged in such a way that, if the probe head's angle is in the ambiguous angular range and above 360°, the tension in the spring provides a force, which moves the probe head out of the ambiguous angular range, for instance towards the first position that is not in the ambiguous angular range.

BRIEF DESCRIPTION OF THE DRAWINGS

Aspects will be described in detail by referring to exemplary embodiments that are accompanied by figures, in which:

FIG. 3a shows the second embodiment of the CMM without covers;
FIGS. 3b-d show details of the CMM of FIG. 3a;
FIGS. 4a-b show two exemplary embodiments of a second joint of a CMM;
FIG. 5 shows an exemplary embodiment of a third joint of a CMM.

DETAILED DESCRIPTION

Figure 1:
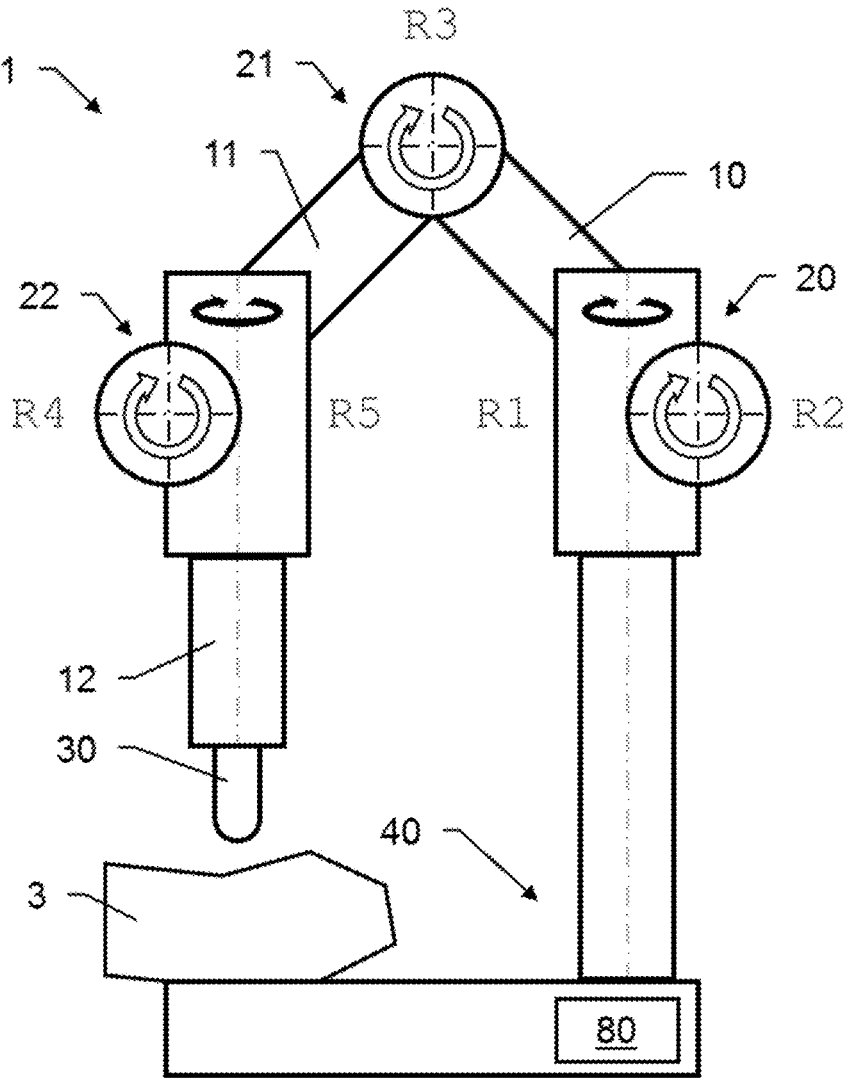
FIG. 1 shows a first exemplary embodiment of a CMM.
Figures 2A, 2B:
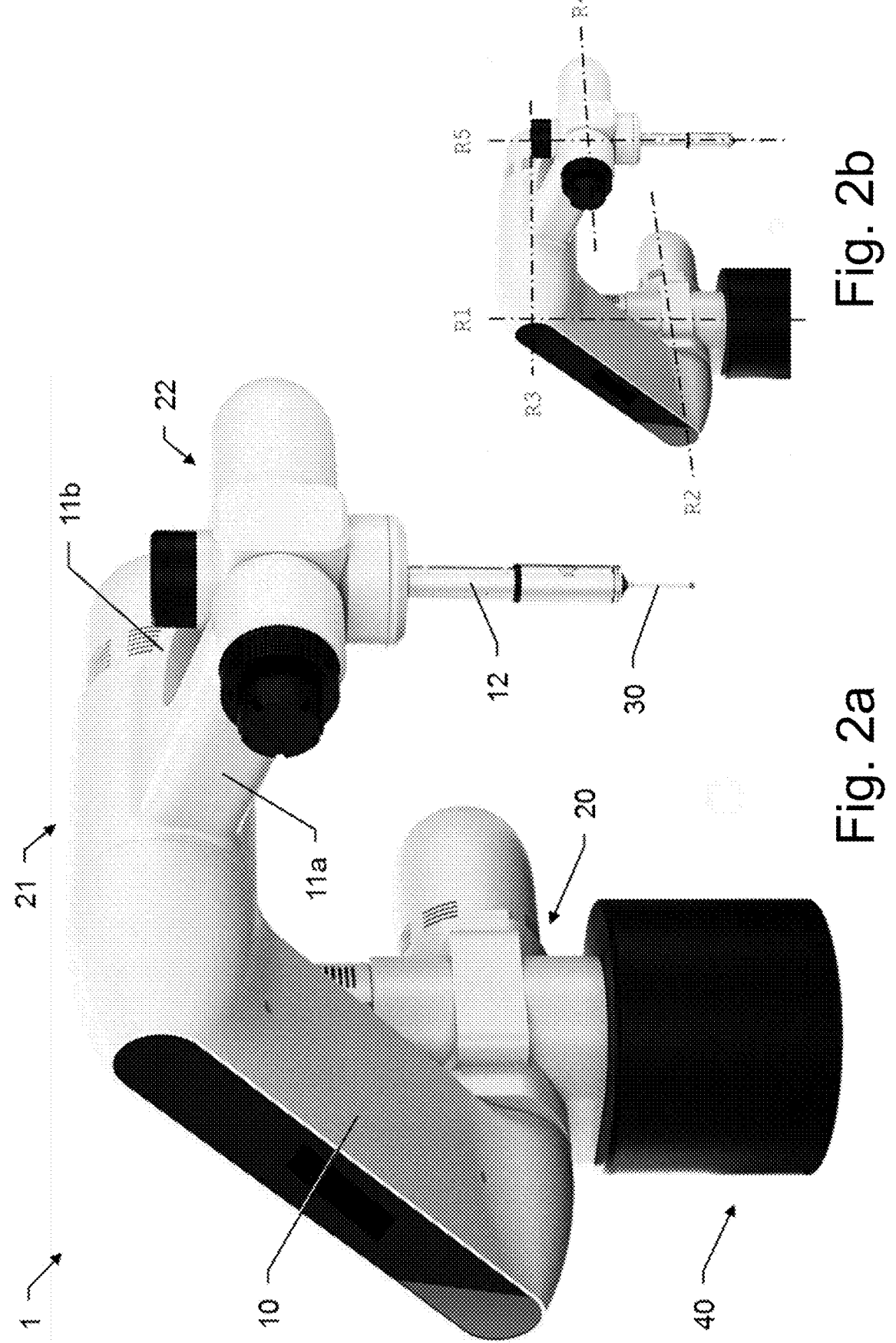
FIGS. 2a-b show a second exemplary embodiment of a CMM including covers.

FIG. 1 shows an exemplary embodiment of a CMM 1 in a simplified manner. FIGS. 2a and 2b show another exemplary embodiment of a CMM 1.

In both embodiments, the CMM 1 is configured for determining spatial coordinates of measurement points on an object 3. It comprises a structure movably connecting a probe head 30 to a base 40. The structure of the CMM 1 comprises three rotary joints 20, 21, 22 and three links 10, 11, 12. The rotary joints 20-22 movably connect the links 10-12 with each other and with the base 40.

As shown in FIGS. 1 and 2b, a first rotary joint 20 provides movability of a first link 10 relative to the base 40 about a first and second axis of rotation R1, R2. A second rotary joint 21 provides movability of a second link 11 relative to the first link 10 about a third axis of rotation R3. A third rotary joint 22 provides movability of a third link 12 relative to the second link 11 about a fourth and fifth axis of rotation R4 and R5. In particular embodiments, the first and second axes of rotation R1, R2 are orthogonally aligned, as are the fourth and fifth axes of rotation R4, R5.

Of course, the CMM may comprise more rotary joints than shown here to allow movement about more than five axes. In particular, any further rotary joint may allow movement about one or more rotary axes. Thus, for instance, a fourth rotary joint may provide movability of additional links about a sixth and seventh axes of rotation (not shown here).

As shown here, the probe head 30 may be connected to the third link 12, e.g. connectable by means of a connection element (and thus replaceable). Alternatively, the probe head 30 may be an integral part of the third link 12, or the third link 12 may be a probe head 30. In this case, the third link 12 may be connectable to the third joint 22.

Each of the joints 20-22 comprises an actuator for moving the connected components relative to another, and a measuring unit with sensors for determining one or more angles between the connected components. A control unit 80 of the CMM 1 is configured to receive angular data related to the measured angles from the measuring units, to control the actuators for driving the probe head 30 relative to the base 40 for approaching the measurement point on the object 3, and to determine spatial coordinates of the measurement point based on the angular data. In FIG. 1, the control unit 80 is provided in the base 40. However, it may as well be provided in other parts of the CMM 1 or as external device.

The CMM 1 is built light-weight. To save weight, the structure may be built so flexible that that its different distortions due to different poses of the structure alone lead to significant deviations of the probe head 30 from its assumed position so that the measured coordinates may deviate from the real coordinates in such a way that, conventionally, the CMM 1 could not be used for highly-precise measurements. In this case, the CMM 1 may have a compensation functionality as described in the European patent application EP22215431.2. Especially the links 10-12 may have a material composition and/or be constructed in a manner that are not considered stable enough, i.e. too flexible, for conventional measurement with a CMM. For instance, the links 10-12 may be made from light metals, particularly aluminium, light metal alloys, plastics and/or carbon-fibre-reinforced polymers.

As shown in FIGS. 2a and 2b, the structural elements (i.e. the rotary joints 20-22 and the links 10-12) of the CMM 1 are enclosed by covers that provide protection from of the surrounding of the CMM and passive thermal insulation to reduce thermal exchange between the enclosed frame elements and the surrounding. The covers may include additional visible status indicators. The covers may be made from plastic materials and optionally comprise one or more isolation layers. For instance, they may comprise a polyamide (PA) or polyethylene terephthalate (PET) shell having a foam filling, e.g. comprising polyurethane (PUR). Optionally, as disclosed in the European patent application EP22185501.8, to actively control a temperature or a temperature distribution of the structure, heating and/or cooling elements may be provided inside the covers.

Figures 3A, 3D:
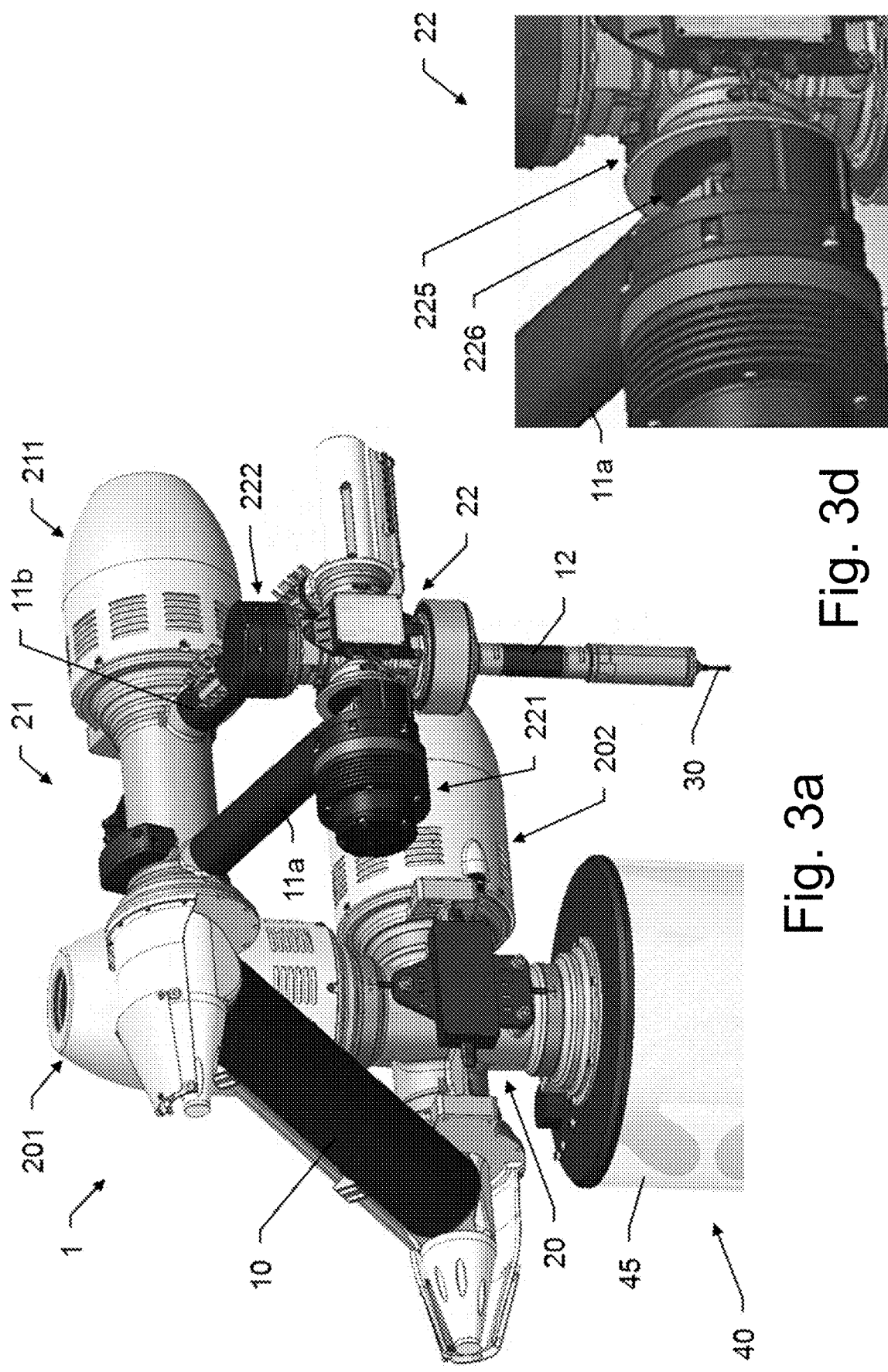

In FIG. 3a, the CMM 1 of FIG. 2a is shown without their covers. As can be seen here, the second link comprises two parallel elements 11a, 11b that link the third joint 22 to the second joint 21, connecting with the third joint 22 on opposite sides of the fifth axis of rotation R5. Such a "fork design" advantageously enhances the stiffness and reduces eigenfrequencies as well as the effects of temperature changes.

One separate driving unit 201, 202, 211, 221, 222 is provided for every axis of rotation, each comprising a motor. Since these generate heat when in use, they are preferably provided separate from the measuring units (not shown here). In the shown example, driving units 201 and 222 are provided on top of their respective joint and, thus, above the respective measuring units, so that the heat emitted by the motors does not affect the measuring units. Regarding the horizontal axes, the driving units 202, 211 and 221 are provided at a lateral end of their respective joint to minimize the effect on the respective measuring units.

Figures 3B, 3C:
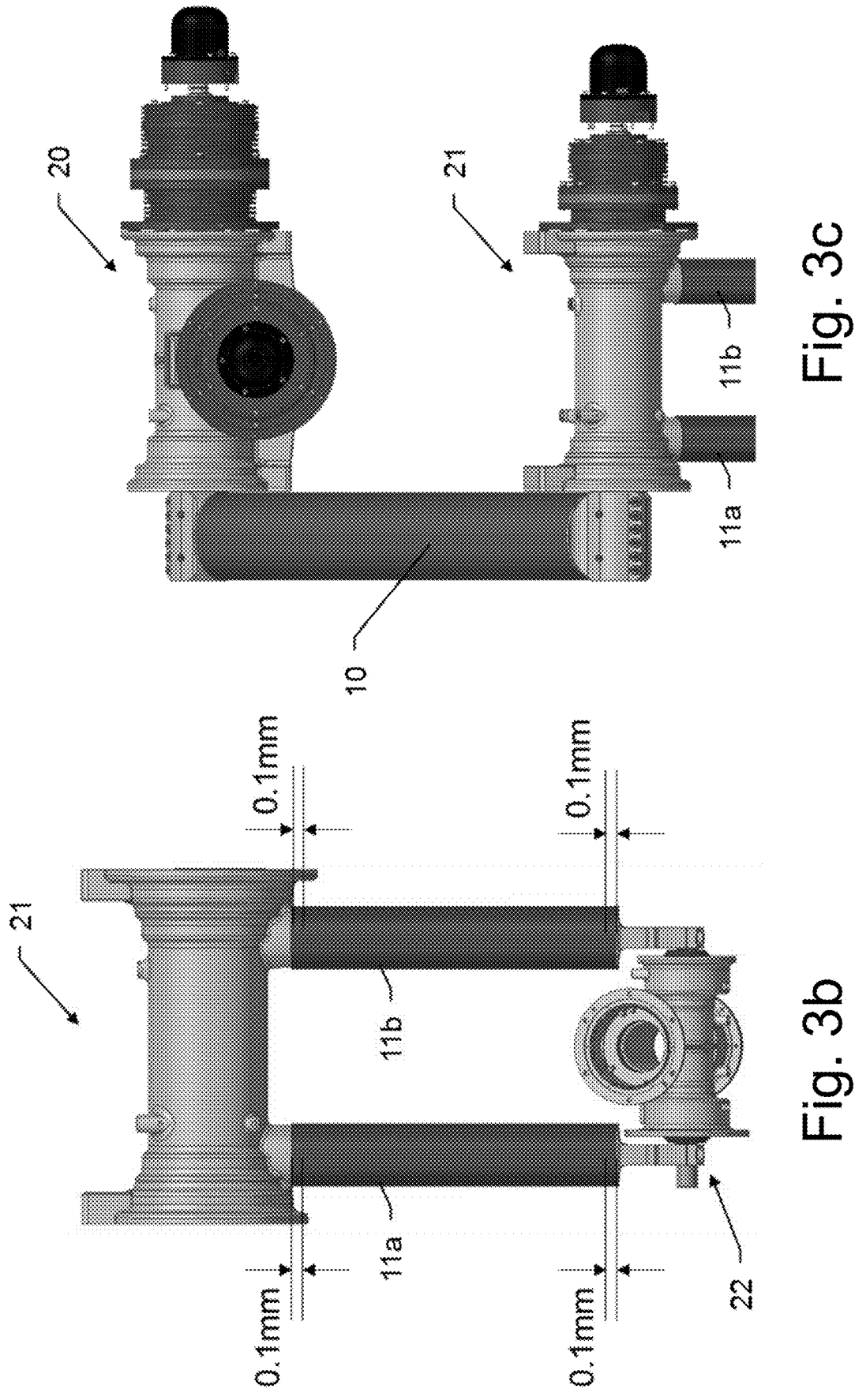

FIGS. 3b, 3c and 3d show details of the CMM 1 of FIG. 3a. FIG. 3b shows the second link comprising two parallel elements 11a, 11b. With this fork-link design, the stiffness of this link increases significantly over a solution with a single link. One disadvantage can be the behaviour over temperature. If the two parallel elements 11a, 11b do not behave exactly the same, the link will bend over time. Therefore, optionally, the two parallel elements 11a, 11b are not axially connected to the interfaces. Instead, on all four interfaces, there may be a gap of about 0.1 mm filled with an adhesive. This approach prevents hysteresis due to freeze tensions during assembly. Alternatively or additionally, as disclosed in the European patent application EP22185501.8, the temperature of the elements 11a, 11b may be actively controlled by providing heating and/or cooling elements that are provided inside the covers around the elements 11a, 11b.

FIG. 3c shows the first link 10, which in the shown embodiment is not built in the fork design but as a single link. This is because the first link 10 is at the beginning of the metrology chain and the thermal impact is the highest there. Although the fork design could provide a solution with higher stiffness, the smallest tension due to thermal movements in the first link 10 might provoke a bending of the whole arm, decreasing the accuracy of the whole CMM 1.

FIG. 3d shows a detail of FIG. 3a regarding the third rotary joint 22. To enhance the movability of the two parallel elements 11a, 11b, cut-outs 226 may be provided at the interfaces on the third joint 22, next to a cross-shaped mounting device 225 of the joint. Such a mounting device is shown in detail in FIGS. 8a,b with respect to the first joint.

FIGS. 4a and 4b show two exemplary embodiments of a second joint 21 of a CMM. As shown here, the joint 21 movably connects two of the links 10, 11. In both embodiments, the joint 21 comprises a driving unit 211 having a motor to actuate the two links 10, 11 that are connected by the joint 21 relative to one another about the third axis of rotation R3. Also, in both embodiments, the joint 21 comprises a measuring unit 216 having one or more angular sensors to determine at least one angle between the two links 10, 11. In the example of FIG. 4a, the measuring unit 216 and the driving unit 211 are provided together, for instance together in a single housing. This allows for a compact setup. In the example of FIG. 4b, the measuring unit 216 and the driving unit 211 are provided thermally decoupled from each other, for instance in separate housings. This reduces the heat transfer between the two components, particularly from the motor of the driving unit 211 to the sensors of the measuring unit 216 and the structural elements of the joint.

FIG. 5 shows an exemplary embodiment of the third rotary joint 22. The joint 22 movably connects two of the links 11, 12. In the shown embodiment, link 11 is embodied as two parallel links 11*a* and 11*b*. The joint 22 comprises a first driving unit 221 having a motor to actuate the links 12 and 11*a/b* relative to one another about the fourth axis of rotation R4, and a second driving unit 222 having a motor to actuate the links 12 and 11*a/b* relative to one another about the fifth axis of rotation R5. The joint 21 further comprises a measuring unit 226, 227 for each of the two axes of rotation R4, R5, each measuring unit having one or more angular sensors to determine at least one angle between the two links 12, 11*a/b*. In the shown example (similar to the example of FIG. 4*b*), the first measuring unit 226 and the driving unit 221 are provided thermally decoupled from each other, for instance in separate housings. The same applies to the second measuring unit 227 and the second driving unit 222.

Figures 6A, 6B:
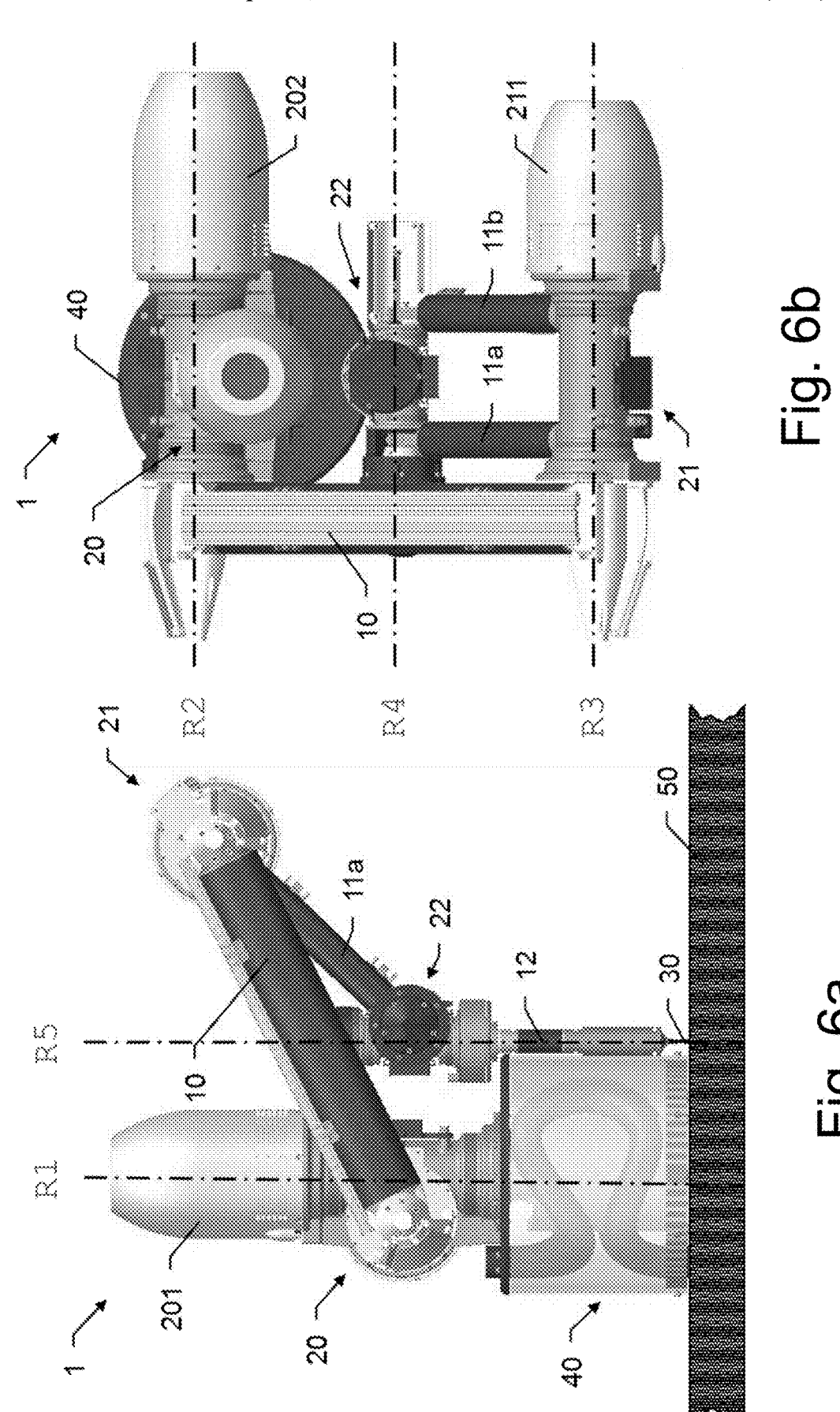
FIGS. 6a-b shows the second embodiment of the CMM without covers, the probe being positioned at the innermost position.

FIGS. 6*a* and 6*b* show an embodiment of the CMM 1, wherein the lengths of the links 10, 11*a*, 11*b* are selected so that the probe head 30 may be moved to measure points directly at the base 40 of the CMM 1, while the first and fifth axes of rotation R1, R5 are parallel. FIG. 6*a* shows the CMM 1 from the side (the base 40 being mounted on a measuring table 50), and FIG. 6*b* shows the CMM 1 with the same pose from the top.

The measuring unit of the second axis of rotation R2 is aligned behind the measuring unit of the first axis of rotation R1, and the measuring unit of the fourth axis of rotation R4 is aligned in front of the measuring unit of the fifth axis of rotation R5. This puts the first and fifth axes of rotation R1, R5 as close together as possible, which allows measurements closer to the base, where the measurement accuracy is best.

Also, as can be seen in FIG. 6*b*, the second, third and fourth axes of rotation R2, R3, R4 are parallel, and the three rotary joints 20, 21, 22 are aligned along a straight line that is (basically) orthogonal to the three parallel axes of rotation R2, R3, R4. The shown symmetric arrangement of the three rotary joints 20, 21, 22 allows that the probe does not shift in the axial direction of the second axis of rotation R2 if the temperature changes. Under the assumption of homogeneous temperatures, the CMM 1 (at least theoretically) thus becomes thermally neutral in this direction.

Figure 7:
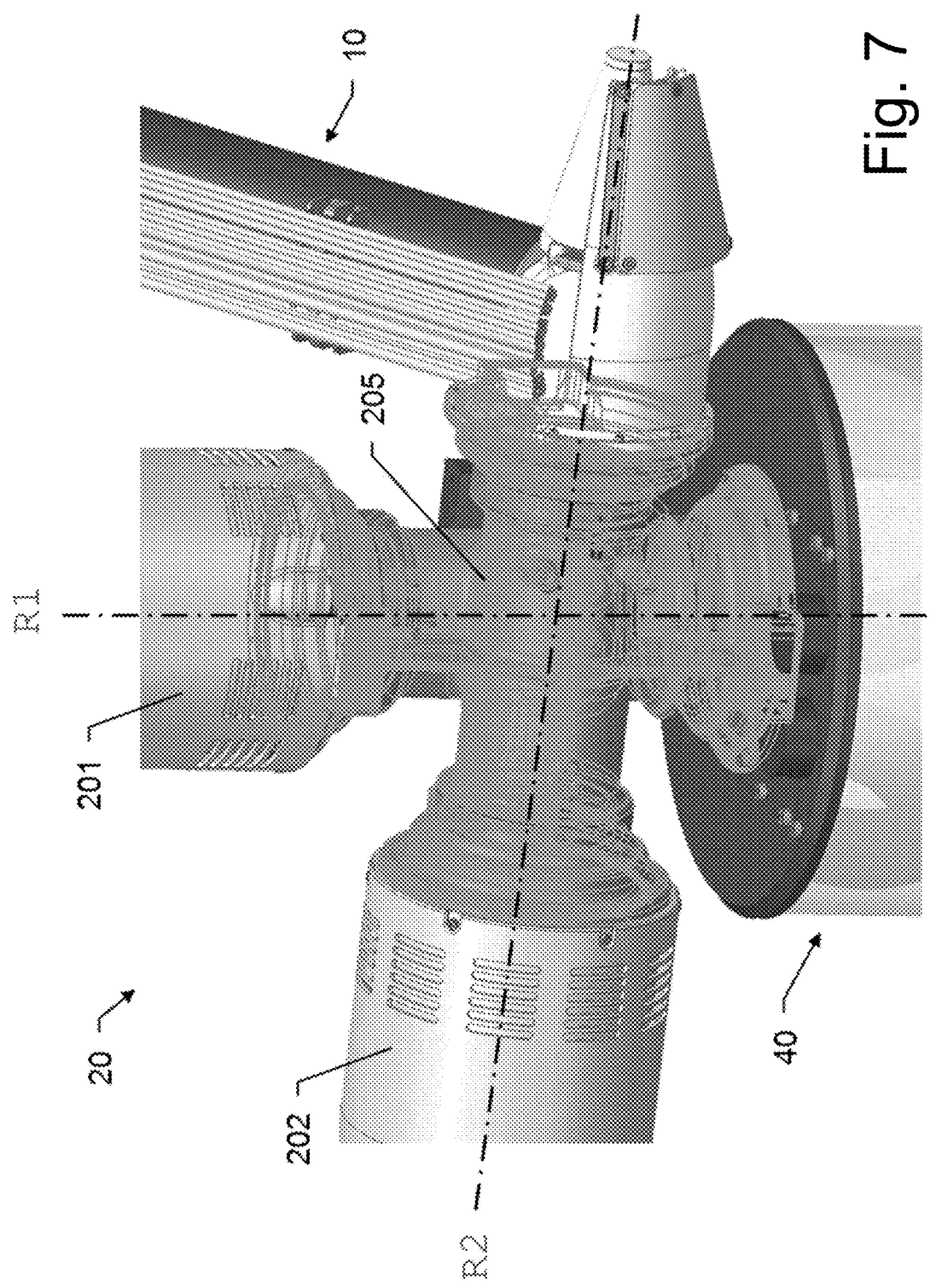
FIG. 7 shows an exemplary embodiment of a first joint of the second embodiment of the CMM.

FIG. 7 shows the first joint 20 of the CMM 1 of FIG. 3. This joint connects the first link 10 rotatably about two orthogonal axes of rotation R1, R2 to the base 40. Two separate driving units 201, 202 are provided for actuating two separate spindles of the joint 20 about the first and second axis of rotation R1, R2, respectively.

Geometrically, it would be desirable that the two axes R1 and R2 would intersect. For constructional reasons, however, the two axes R1, R2 need to be skew. To increase the accuracy of the system, it is desirable that the distance between the two axes R1, R2 is as small as possible (the same applies to axes R4 and R5). To achieve this, the first joint 20 comprises a cross-shaped mounting device 205 that is configured to accept two orthogonal spindles of the joint 20, each spindle being aligned with one of the two axes of rotation R1, R2.

Figures 8A, 8B:
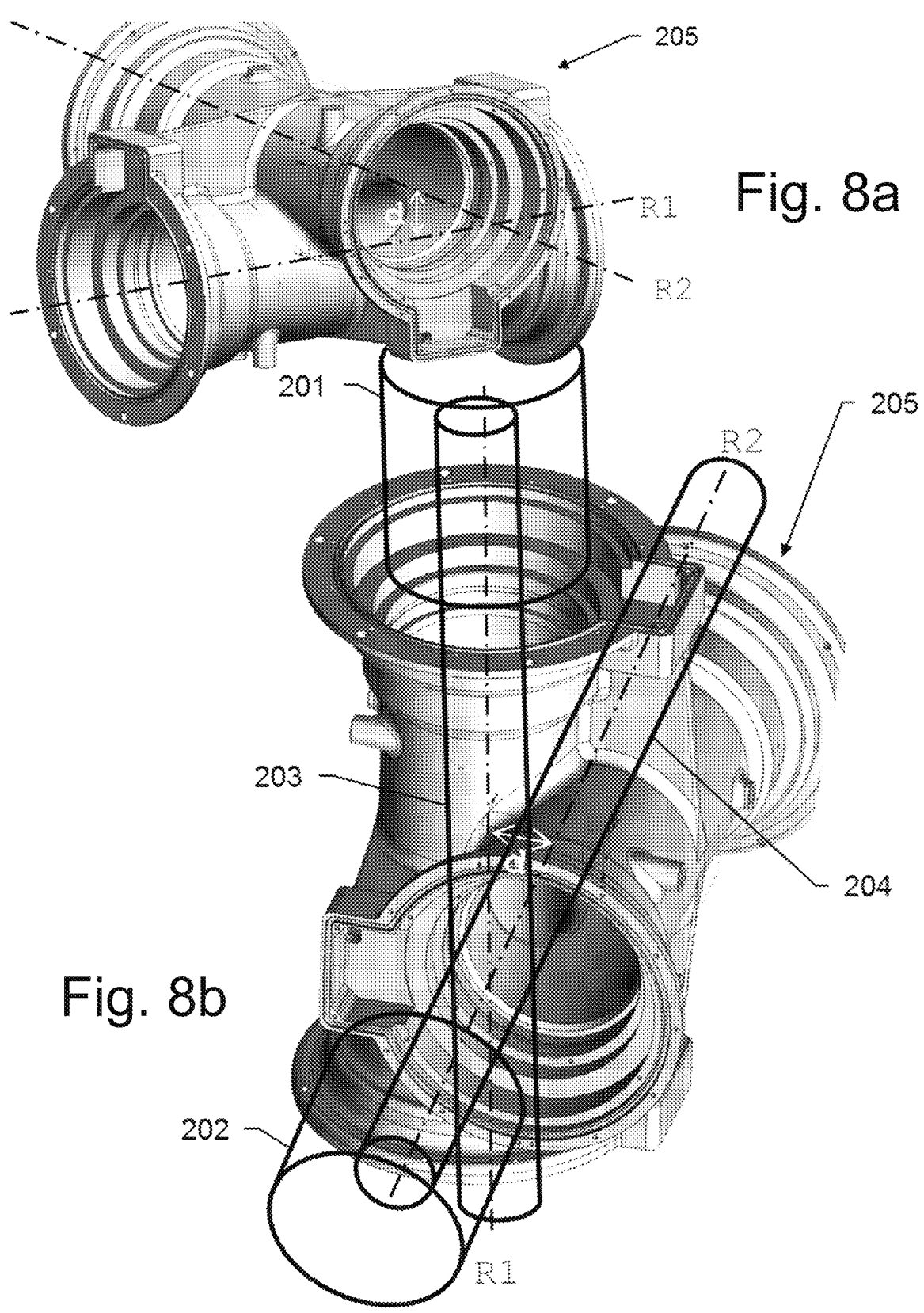
FIGS. 8a-b show a cross-shaped mounting device as part of the first joint of FIG. 7.

This mounting device 205 is shown in detail in FIGS. 8*a* and 8*b*. It serves as a common housing for two orthogonal spindles 203, 204 of the first joint 20. Preferably, the mounting device 205 is made from a single piece of metal, e.g. stainless steel. The same or a similar, preferably smaller, mounting device 225 may be provided at the third joint 22 (see FIG. 3*b*). The cross-shaped device 205 comprises two channels that are aligned along the two axes of rotation R1, R2 so that there is a small distance d between the two axes. The minimal distance is given by the diameter of one of the spindles (i.e. the spindle that is assembled first) at its middle zone and by a maximal diameter of the other spindle (i.e. the spindle that is assembled second) from its one end that penetrates the mounting device to its middle zone.

In FIG. 8*b*, the mounting device 205 accepts two spindles 203, 204 in its channels so that each spindle is aligned with one of the axes of rotation R1, R2. The distance d is chosen to allow both spindles 203, 204 to be placed inside the mounting device 205 without touching each other. The positions of the driving units 201, 202 at the respective ends of the spindles 203, 204 are indicated.

Figure 9:
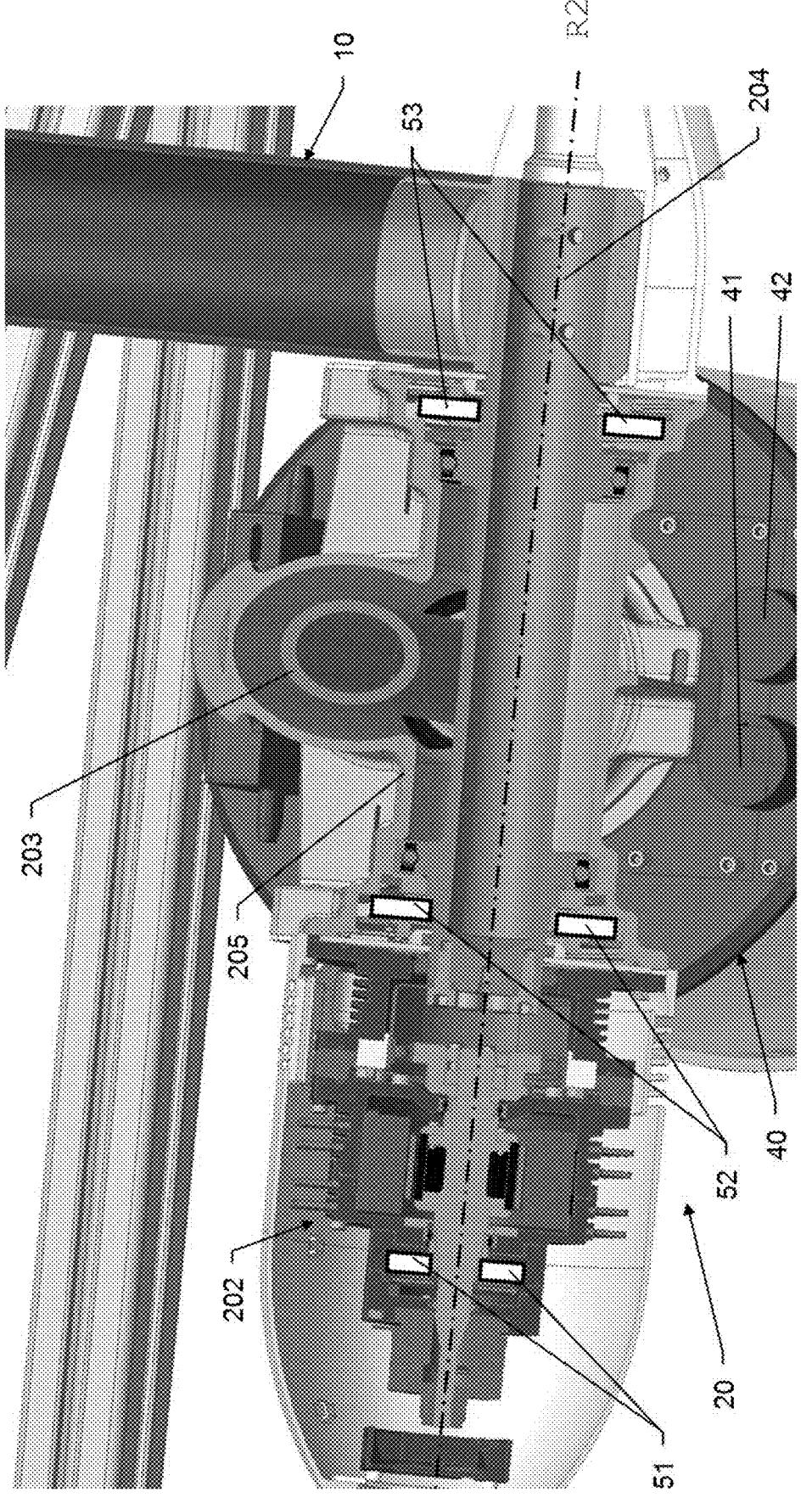
FIG. 9 show an exemplary sensor arrangement in a measurement unit of the first joint of FIG. 7.

FIG. 9 is a sectional view of the first rotary joint 20 along the second axis of rotation R2, illustrating a measuring unit comprising a multitude of sensors arranged along said axis of rotation R2 to allow deriving a position of the first link 10 relative to the base 40 in at least five degrees-of-freedom (5DoF).

The spindles 203, 204 are housed by the mounting device 205 described above. The first spindle 203 is positioned inside the mounting device 205 and driven by a first driving unit 201 (not shown here) to rotate about the first axis of rotation. A second driving unit 202 is connected to the mounting device 205 and configured to rotate the spindle 204 about the second axis of rotation R2, thereby also moving the first link 10, which is attached to the spindle 204.

The spindle 204 is equipped with more than one rotary encoder. Spatial 3D distribution of sensing elements allows to achieve much higher accuracy of multi-DoF sensing, thus increasing the metrological performance of the whole CMM. Although not shown here, also spindle 203 may be equipped with more than one rotary encoder as shown with respect to spindle 204.

In the shown embodiment, three rotary encoders 51, 52, 53 are provided, arranged at a distance from one another along the axis of rotation R2, i.e. along the second spindle 204 of the first rotary joint 20. A first rotary encoder 51 is assigned to the driving unit, and a second and third rotary encoder 52, 53 are assigned to the measurement unit. For instance, each rotary encoder 51, 52, 53 may comprise a code disk carrying an optically detectable code and a sensor arrangement, composed of at least two read heads, wherein each sensor arrangement detects a code element projection. EP 2 553 386 B1 discloses a similar arrangement for a joint of a manually operated articulated arm CMM, wherein two rotary encoders are arranged along the same axis of rotation.

Such an arrangement allows to not only measure the angle of rotation about the axis R2. By determining axial and/or radial displacements and/or tilting of the code carriers in each of the rotary encoders 52, 53, the exact three-dimensional position of the code carriers with respect to the sensor arrangements can be derived. This exactly determined position, which is detected on the basis of measurement position variables such as an angle of rotation about the axis of rotation, a radial displacement direction, a radial displacement extent, an axial displacement extent, a tilting direction and/or a tilting angle can be derived. Thus, extension and change in length of the common axis or of the housing of the connection element can be identified and quantitatively determined on the basis of the change in distance of the code carriers relative to the respective sensor arrangements.

Figure 10:
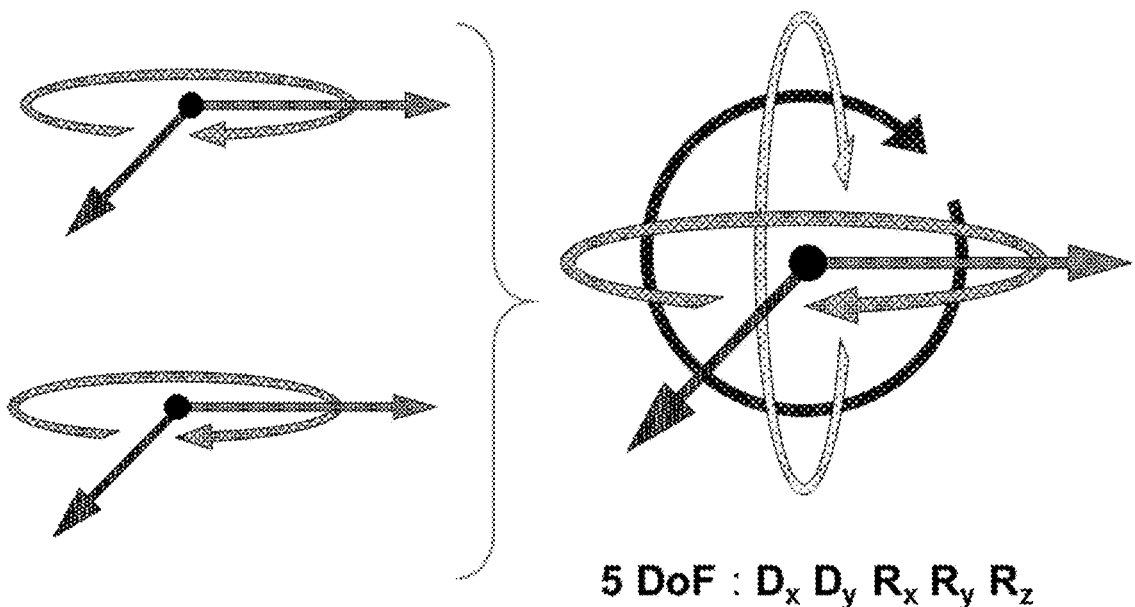
FIG. 10 illustrates the 5DoF measurement using the sensor arrangement of FIG. 9.

FIG. 10 illustrates the concept of the 5DoF measurement. Each of the two encoders of the measurement unit measures three degrees-of-freedom (3DoF): a rotation about the respective axis of rotation ($R_z$) as the basic feature of each rotary encoder, and displacements in two directions orthogonal to the axis of rotation ($D_x$ and $D_y$). Together, these measurements from both encoders 52, 53 can be used to determine the position of the first link 10 relative to the mounting device 205 in at least five degrees-of-freedom (5DoF), including all three rotatory degrees-of-freedom ($R_x$, $R_y$, $R_z$). Since such a sensor arrangement is also provided for the first axis of rotation, the position of the first link 10 relative to the basis 40 can be determined in 5DoF. Alternatively, one or more encoders that enable 6DoF measurement can be used as well.

Figure 11:
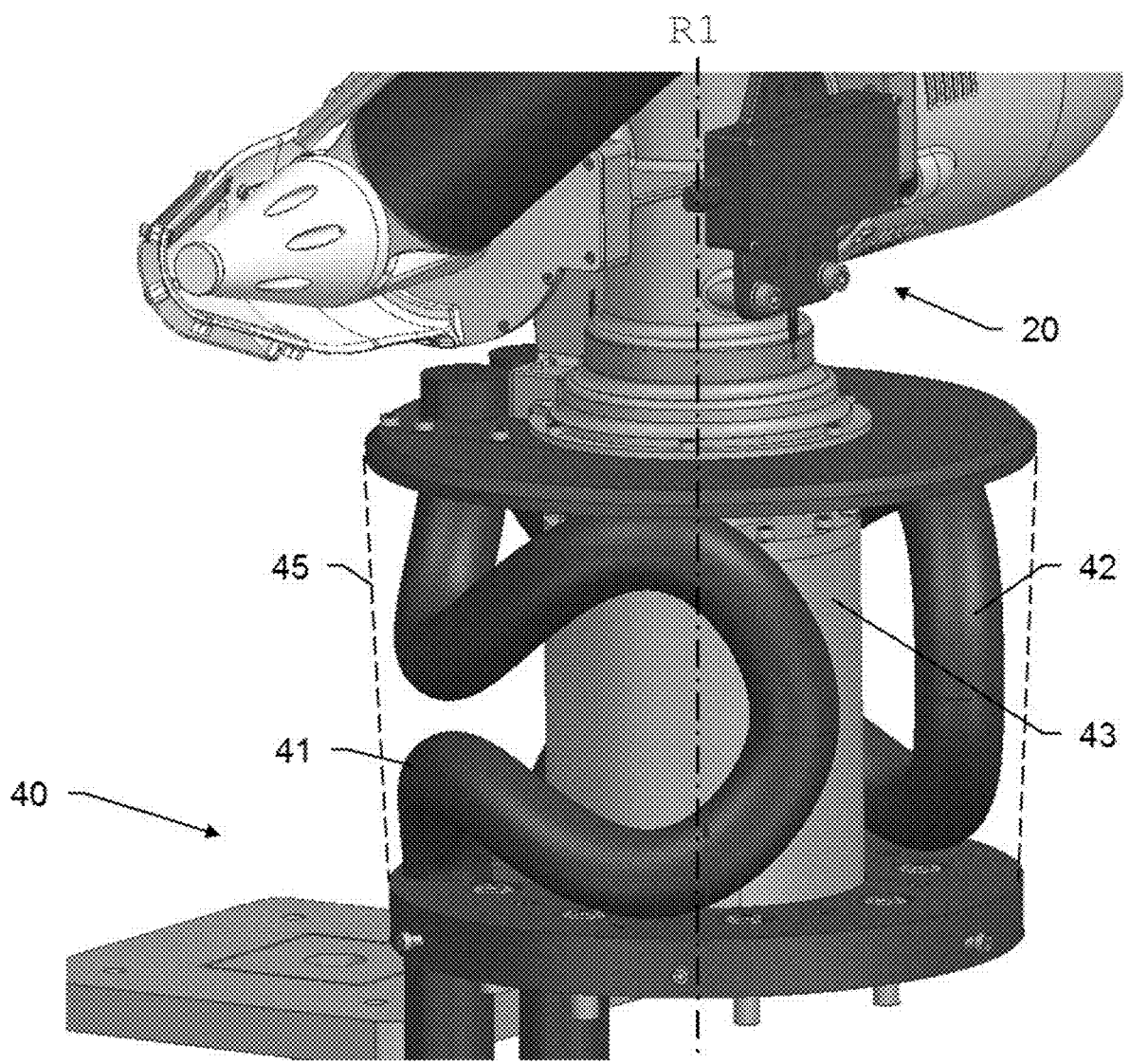
FIG. 11 shows an exemplary cable arrangement of a CMM.

FIG. 11 shows a cable arrangement at the first axis of rotation R1 for providing electric energy to the structure of the CMM, e.g. for powering the driving units and the measuring units. To allow full movability of the CMM, this cable arrangement is configured to allow a rotation of the first link about the first axis of rotation R1 of at least 180° in both directions. In preferred embodiments, it allows rotations of up to 360° (or more) in each direction. Similar cable arrangements as the one shown here may also be provided for the other axes of rotation.

Two cable bundles 41, 42 are provided movably in a common housing 45, wherein a lower end of each cable bundle 41, 42 is fixedly connected to the base 40, and an upper end of each cable is fixedly connected to the first rotary joint 20—or more precisely to a part of the first rotary joint 20 that is rotatable about the first axis of rotation R1 relative to the base 40. Each cable bundle 41, 42 may comprise a plurality of cables.

To allow the required movability about the first axis of rotation R1, in the shown position of the CMM, which can be described as a zero position with respect to the first axis of rotation R1, each of the two cable bundles 41, 42 is folded in the shown way partly around a cylindrical body 43, forming a closed loop that has the shape of the Greek letter Ω (capital omega) lying on the side (i.e. the reading direction being parallel to the first axis of rotation R1). The cylindrical body 43 is aligned with the first axis of rotation R1, e.g. being or enclosing a spindle 203 of the first rotary joint 20.

Each cable bundle may be surrounded by a hose that preferably has a low friction coating to improve gliding behaviour within the housing 45 and around the cylindrical body 43. Since the cable hoses may be pushed outwards by their shape, the housing 45 (on the inside) may have a PTFE (polytetrafluoroethylene; "Teflon") coating to further enhance the gliding behaviour and the cylindrical body 43. Optionally, also the cylindrical body can be PTFE coated.

Having the shown shape, each cable bundle 41, 42 winds itself around the cylindrical body 43 without getting in the way of the other cable bundle when the first link is rotated either clockwise or counter-clockwise about the first axis of rotation R1. The cable bundles need to be long enough to allow each cable bundle 41, 42 to be wound completely around the cylindrical body 43 at least once in each direction—in order to allow a movement of 360° each cable bundle 41, 42 would have to be wound completely around the cylindrical body 43 at least twice in each direction.

One of the cable bundles may comprise cables that provide power to at least a subset of driving units and measurement units. The other cable bundle may comprise cables that provide data communication between the control unit of the CMM and at least a subset of driving units and measurement units. For instance, the data communication may comprise the angular data and control data for controlling the motors.

Advantages of this cable management comprise that it is symmetrical in both directions and has no segments, and that the cables do not twist or kink. Also, electro-mechanical problems with slip rings are avoided.

Figures 12A, 12B:
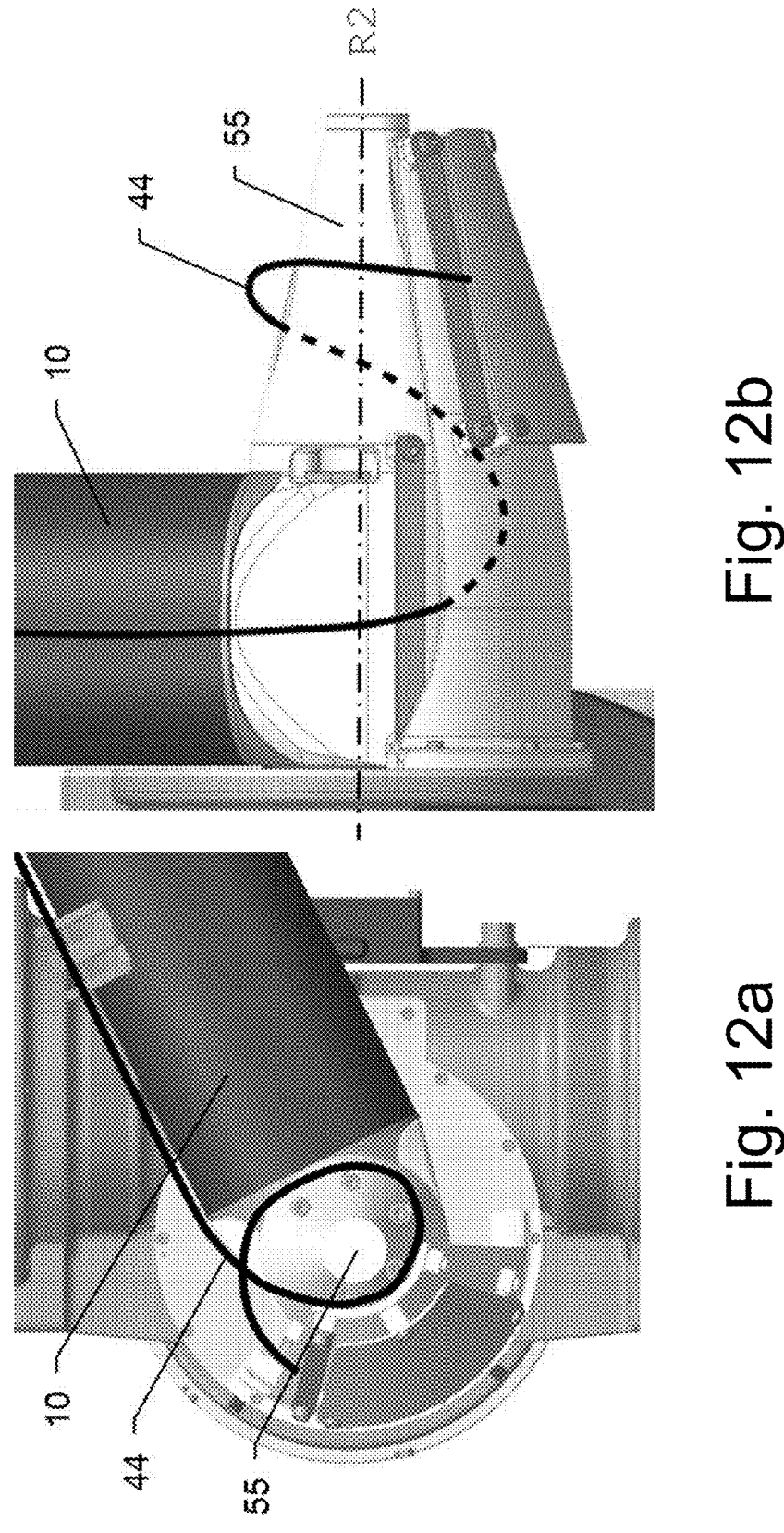
FIGS. 12a-b show an exemplary cable routing along the first link.

FIGS. 12a and 12b illustrate exemplary cable routings at the other axes of rotation. In particular, it can be used at all axes of rotation except the first and the last, i.e. in the shown embodiment at the second, third and fourth axes of rotation R2, R3, R4. While the length of each cable or cable bundle in the CMM structure remains the same, bending radii of the cables change as the axes of the CMM rotate. As shown here with the example of the second axis of rotation R2, the cable 44 (or cable bundle)—coming from the first rotary joint—may be wrapped around a mandrel 55 that is positioned on the axis of rotation, before it is guided along the first link 10. This spiral shape of the cable 44 increases its bending radius. In this way, a critical bending radius is not undershot. That allows for a more compact design of the cable box. The conical shape of the mandrel 55 (see FIG. 12b) also allows a smaller design. Preferably, cables that require large bending radii (for instance thicker cables) are positioned on the larger diameter side of the cone because the bending radius is greater there. Especially the shielding may limit the bending radius.

Figure 13A:
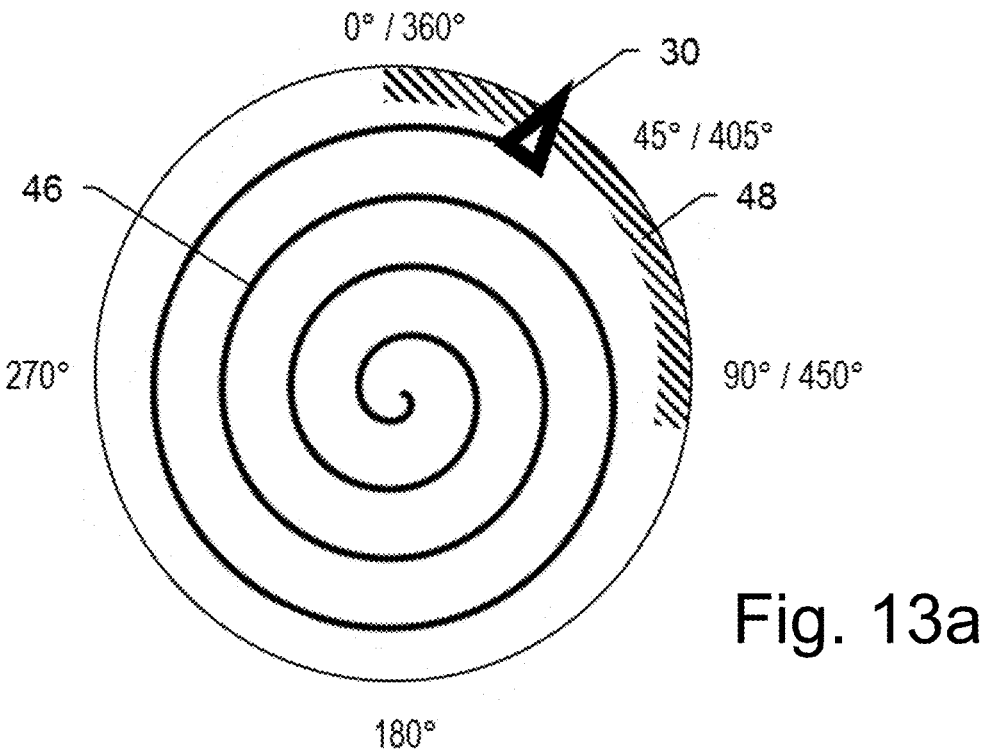
FIGS. 13a-c show an exemplary spring cable arrangement at the probe head.
Figure 13B:
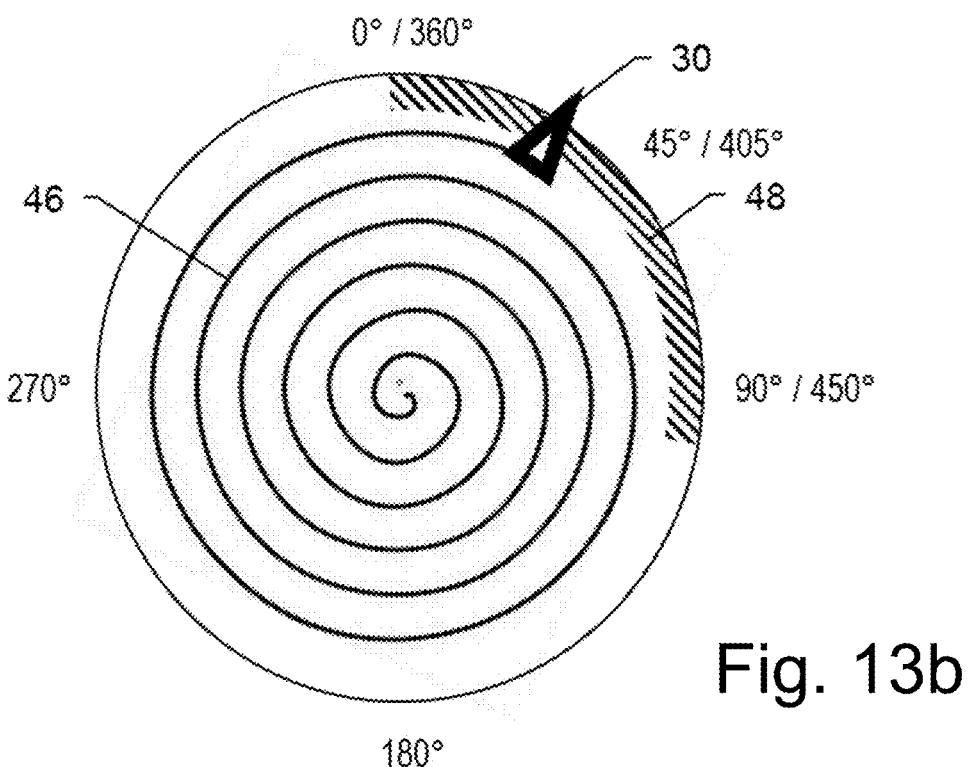
Figures 13C, 14:
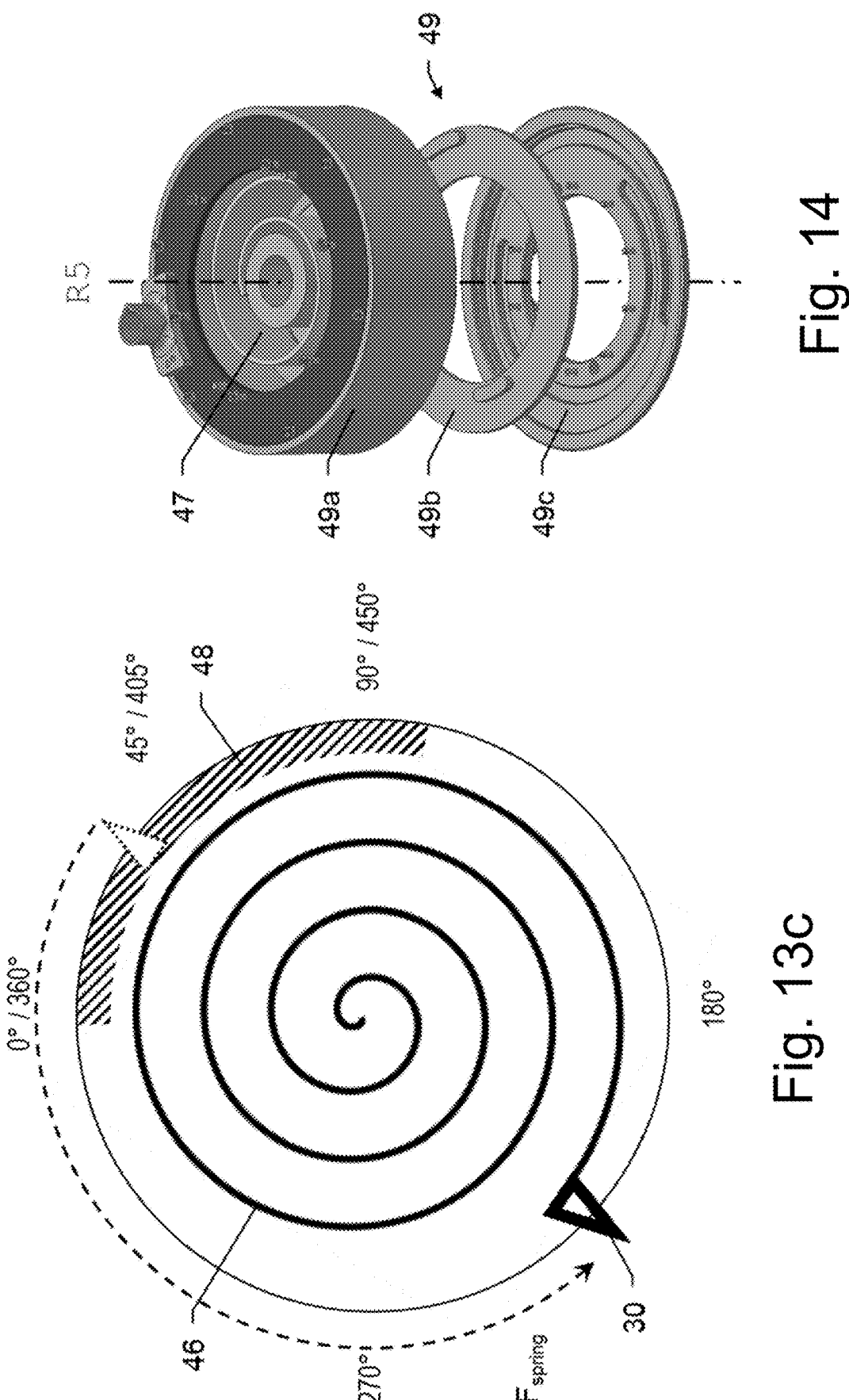
FIG. 14 shows an exemplary spiral guidance for the spring cable arrangement of FIGS. 13a-c.

FIGS. 13a-c illustrate a cable spring 46 that can be used at the fifth axis of rotation R5, i.e. at the probe head's axis of rotation. A cable is provided, a length of which allowing a movability of the probe head 30 about its axis of rotation by more than 360°—in the shown example of about 450°. Additionally, a mechanical end stop may be provided (see FIG. 14) that allows a movement that does not exceed the movement allowed by the cable length. For instance, the mechanical end stop may allow a movement from a first position of ±225°.

The cable length and the mechanical end stop thus both allow a movement of the tiltable probe head 30 about the axis of rotation of 450°. An absolute angle sensor may be provided that measures the angle of rotation about the axis. Since the allowed movement is above 360°, an angular range exists in which the sensor cannot determine the position unambiguously (ambiguous angular range 48). If the actuator providing the rotational movement is switched off while the probe head 30 is in the ambiguous angular range 48, the CMM may lose the information whether the next end stop is clock-wise or counter-clock-wise. In FIGS. 13a and 13b, the position of the probe head 30 is in the ambiguous angular range 48.

In FIG. 13a, the angle of the probe head 30 is at about 30°. In FIG. 13b, the angle is at about 390°. For an angle sensor however, both angles may appear to be the same.

To overcome this problem, the cable is provided with a spiral winding (cable spring 46), wherein a movement of the probe head 30 about its axis of rotation enhances or reduces a tension within the winding. Depending on the cable properties, the cable spring 46 may comprise only the cable itself, in particular a flat cable, or the cable and an additional spring, e.g. made from metal or plastic.

In the shown example, clock-wise movements enhance the tension. The tension in the cable spring 46 providing a force $F_{spring}$ which, when released (e.g. due to switching off the actuator), rotates the probe head 30 back to a position with less tension, e.g. to a position in which the cable spring 46 is relaxed. In the shown example, the force $F_{spring}$ provides a counter-clock-wise movement. In FIG. 13b the tension in the spring is higher than in FIG. 13a—illustrated here by the higher number of windings.

Thus, if the actuator providing the rotational movement is switched off while the probe head 30 is in the ambiguous angular range 48, depending on the amount of tension in the cable spring 46, the probe head 30 is moved out of the ambiguous angular range 48. That means if (as shown in FIG. 13*b*) the probe head 30 is in the ambiguous angular range 48 and above the angle of 360° (i.e. between 360° and) 450°, then it is moved out of the ambiguous angular range 48 (as shown in FIG. 13*b*). If (as shown in FIG. 13*a*) the probe head 30 is in the ambiguous angular range 48 and below the angle of 360° (i.e. between 0° and) 90° then it remains in the ambiguous angular range 48. Thus, if the actuator is started again, the absolute position may be determined unambiguously with a value between 0° and 360°.

FIG. 14 shows an exemplary cable box at the fifth axis of rotation R5 for the cable spring 46 of FIGS. 13*a-c*. A spiral guidance 47 is provided in the third link for guiding the cable and maintaining the cable's winded shape. The spiral guidance 47 itself also may have a spiralled shape, e.g. with the fifth axis of rotation R5 as a centre. The spiral guidance 47 may have a PTFE (polytetrafluoroethylene; "Teflon") coating to enhance the gliding behaviour of the cable spring 46.

FIG. 14 also shows an example for a mechanical end stop 49 that comprises three parts 49*a*, 49*b*, 49*c*. The upper part 49*a* comprises grooves (not visible here) corresponding to the grooves visible on top of the lower part 49*c* in mirrored orientation. The middle part 49*b* comprises tongues not only on its upper side as visible here to connect with the grooves of the upper part 49*a*, but also on its lower side (not visible here) to connect with the grooves of the lower part 49*c*. The shown end stop allows a movement of ±225° (i.e. a total of) 450°. If the allowed movement is selected below (or equal-ling) the movement allowed by the cable length, the mechanical end stop 49 protects the cable from stretching.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A coordinate measuring machine for determining at least one spatial coordinate of a measurement point on an object, the coordinate measuring machine comprising a structure movably connecting a probe head to a base, the structure comprising a plurality of rotary joints and a plurality of elongate components, the components comprising a plurality of links, wherein each rotary joint comprises at least one driving unit comprising a motor, and at least one measuring unit comprising one or more sensors to determine at least one angle and to generate angular data, wherein the coordinate measuring machine comprises a control unit configured to control the motor of each driving unit for driving the probe head relative to the base for approaching the measurement point, to receive the angular data, and to determine the at least one spatial coordinate of the measurement point based on the angular data, characterized in that a first rotary joint provides movability of a first link relative to the base about a first axis of rotation and about a second axis of rotation;

a second rotary joint provides movability of a second link relative to the first link about a third axis of rotation; and a third rotary joint provides movability of a third link and/or the probe head relative to the second link about a fourth axis of rotation and about a fifth axis of rotation.

2. The coordinate measuring machine according to claim 1, wherein the first rotary joint comprises two separate driving units and two separate measuring units, wherein a first driving unit provides motorized movability of the first link relative to the base about the first axis of rotation, a second driving unit provides motorized movability of the first link relative to the base about the second axis of rotation;

a first measuring unit measures at least an angle of rotation about the first axis of rotation;

a second measuring unit measures at least an angle of rotation about the second axis of rotation, particularly wherein the first and second axes of rotation are orthogonally aligned or aligned in an angle of between 85° and 95°.

3. The coordinate measuring machine according to claim 2, wherein the first rotary joint comprises a cross-shaped mounting device that is configured to accept two orthogonal spindles of the first rotary joint, each spindle being aligned with one of the first and second axes of rotation, wherein the mounting device is made from a single piece of metal, particularly stainless steel.

4. The coordinate measuring machine according to claim 1, wherein the third rotary joint comprises two separate driving units for providing motorized mov-ability of the third link and/or the probe head relative to the second link about the fourth axis of rotation and about the fifth axis of rotation; and two separate measuring units for determining at least angles of rotation about the fourth axis of rotation and about the fifth axis of rotation, particularly wherein the fourth and fifth axes of rotation are orthogonally or basically orthogonally aligned; and/or the third rotary joint comprises a cross-shaped mounting device that is configured to accept two orthogonal spindles of the third rotary joint, each spindle being collinear with one of the fourth and fifth axes of rotation.

5. The coordinate measuring machine according to claim 1, wherein the second link is embodied as two parallel links, wherein the second rotary joint provides movability of the two parallel links relative to the first link about the third axis of rotation; and the third rotary joint provides movability of the third link and/or the probe head relative to the second link about the fourth axis of rotation and about the fifth axis of rotation, wherein the first link is embodied as a single link.

6. The coordinate measuring machine according to claim 5, wherein the two parallel links connect with the third rotary joint at a first position and at a second position, wherein the first position and the second position are on opposite sides of the fifth axis of rotation.

7. The coordinate measuring machine according to claim 6, wherein the third joint comprises a cut-out at the first position and/or second position to enhance movability of the third link and/or the probe head relative to the two parallel links about the fourth axis of rotation.

8. The coordinate measuring machine according to claim 5, wherein the first link and the two parallel links are configured to allow the probe head to approach a measurement point next to the base while the first and fifth axes of rotation are parallel, particularly configured with respect to a length of the first link relative to a length of the two parallel links.

9. The coordinate measuring machine according to claim 1, wherein a measuring unit is assigned to each of the axes of rotation, wherein at least one of the sensors of at least one measuring unit is a rotary encoder determining at least one angle about the axis of rotation to which the respective measuring unit is assigned.

10. The coordinate measuring machine according to claim 9, wherein at least one measuring unit comprises at least two rotary encoders and is configured to measure angles in at least five degrees of freedom, particularly wherein one measuring unit and one driving unit are provided for each axis of rotation.

11. The coordinate measuring machine according to claim 1, comprising two cable bundles inside a common housing, wherein a first cable bundle provides electric energy to the structure for powering the driving units and the measuring units;

a second cable bundle provides data communication between the control unit and at least a subset of driving units and measuring units, the data communication comprising at least one of the angular data and control data for controlling the motors;

a first end of each cable bundle is fixedly connected to the base and a second end of each cable bundle is fixedly connected to a part of the first rotary joint that is rotatable about the first axis of rotation relative to the base; and the cable bundles are arranged inside the housing to allow a rotation of the first link about the first axis of rotation of at least 180° in each direction.

12. The coordinate measuring machine according to claim 11, wherein, to allow the rotation of the first link about the first axis of rotation, in a first position of the coordinate measuring machine, each of the two cable bundles is folded in such a way that each cable bundle winds itself around a cylindrical body that is aligned with the first axis of rotation, if the first link is rotated clockwise or counter-clockwise about the first axis of rotation; and a length of the cable bundles is configured to allow both cables to be wound around the cylindrical body at least once, in particular at least twice, in each direction, particularly wherein in the first position each of the two cable bundles forms a closed loop, in particular being shaped like a tilted $\Omega$;

the first position is a zero position with respect to the first axis of rotation;

the cylindrical body is a spindle or an extension to a spindle of the first rotary joint, or a a spindle of the first rotary joint is attached to the cylindrical body;

each cable bundle is surrounded by a hose; and/or the cylindrical body and/or the housing has a PTFE coating.

13. The coordinate measuring machine according to claim 1, wherein a first actuator provides movability of the probe head about a probe head's axis of rotation, particularly the fifth axis of rotation;

the probe head is connected by at least one cable, a length of the cable allowing a movability of the probe head about its axis of rotation by more than 360°, particularly by at least ±210° or ±225° from a first position;

the cable is arranged as a spring, wherein a relative movement of the probe head, particularly about its axis of rotation, enhances or reduces a tension within the spring; and the spring is arranged in such a way that if the first actuator is turned off, a tension in the spring is automatically released, providing a force (Fspring) which moves the probe head about its axis of rotation, particularly towards the first position;

wherein the probe head is tiltable for approaching the measurement point.

14. The coordinate measuring machine according to claim 13, wherein the third link comprises a spiral guidance for guiding the cable and maintaining the cable's shape as a spring, the spiral guidance having a spiralled shape, particularly with the fifth axis of rotation as a centre, particularly wherein the spiral guidance has a PTFE coating; and/or a mechanical end stop providing a movability of the probe head about its axis of rotation that equals or is smaller than the movability allowed by the length of the cable, particularly wherein the mechanical end stop allows a movement of at least ±210° or ±225° from the first position.

15. The coordinate measuring machine according to claim 13, wherein an absolute angular sensor is provided for determining an angle of the probe head relative to its axis of rotation, wherein the probe head's movability about its axis of rotation by more than 360° results in an ambiguous angular range, in which the absolute angular sensor cannot determine the angle of the probe head unambiguously, and the spring is arranged in such a way that, if the probe head's angle is in the ambiguous angular range and above 360°, the tension in the spring provides a force (Fspring) which moves the probe head out of the ambiguous angular range, particularly towards a first position that is not in the ambiguous angular range.

16. The coordinate measuring machine according to claim 15, wherein the absolute angular sensor for determining the angle of the probe head relative to its axis of rotation determines angles between 0° and 360°.

17. The coordinate measuring machine according to claim 14, wherein an absolute angular sensor is provided for determining an angle of the probe head relative to its axis of rotation, wherein the probe head's movability about its axis of rotation by more than 360° results in an ambiguous angular range, in which the absolute angular sensor cannot determine the angle of the probe head unambiguously, and the spring is arranged in such a way that, if the probe head's angle is in the ambiguous angular range and above 360°, the tension in the spring provides a force (Fspring) which moves the probe head out of the ambiguous angular range, particularly towards a first position that is not in the ambiguous angular range.

* * * * *